US007947407B2

(12) United States Patent
Schaevitz et al.

(10) Patent No.: US 7,947,407 B2
(45) Date of Patent: May 24, 2011

(54) FUEL CELL APPARATUS HAVING A SMALL PACKAGE SIZE

(75) Inventors: Samuel B. Schaevitz, Fremont, CA (US); Aleksander Franz, Winchester, MA (US); Roger W. Barton, Andover, MA (US)

(73) Assignee: Lilliputian Systems, Inc., Wilmington, MA (US)

( * ) Notice: Subject to any disclaimer, the term of this patent is extended or adjusted under 35 U.S.C. 154(b) by 1500 days.

(21) Appl. No.: 11/115,980

(22) Filed: Apr. 27, 2005

(65) Prior Publication Data

US 2006/0246333 A1    Nov. 2, 2006

(51) Int. Cl.
*H01M 8/12* (2006.01)
*H01M 8/04* (2006.01)

(52) U.S. Cl. .................... 429/508; 429/488; 429/433
(58) Field of Classification Search .......... 429/508, 429/488, 433
See application file for complete search history.

(56) References Cited

U.S. PATENT DOCUMENTS

| 3,420,944 A * | 1/1969 | Holcomb ............... 313/318.12 |
| 3,466,196 A * | 9/1969 | Gosmand ..................... 429/26 |
| 4,997,726 A * | 3/1991 | Akiyama et al. .............. 429/30 |
| 5,347,816 A * | 9/1994 | Nelson et al. ................. 62/46.2 |
| 5,641,585 A * | 6/1997 | Lessing et al. ................. 429/26 |
| 6,117,302 A * | 9/2000 | Roha ............................ 205/343 |
| 6,939,632 B2 | 9/2005 | Arana et al. .................. 429/17 |
| 7,267,779 B2 | 9/2007 | Arana et al. ..................... 216/2 |
| 2001/0049039 A1 | 6/2001 | Haltiner, Jr. |
| 2003/0096147 A1* | 5/2003 | Badding et al. ............... 429/30 |
| 2004/0157096 A1* | 8/2004 | Peterson ....................... 429/13 |

FOREIGN PATENT DOCUMENTS

| EP | 0355420 | 2/1990 |
| EP | 1439594 | 7/2004 |
| WO | WO 03/013729 | 2/2003 |
| WO | WO 2005/030376 | 4/2005 |

* cited by examiner

*Primary Examiner* — Dah-Wei D Yuan
*Assistant Examiner* — Zachary Best
(74) *Attorney, Agent, or Firm* — Sunstein Kann Murphy & Timbers LLP

(57) ABSTRACT

The invention relates to a fuel cell apparatus that includes a housing. The housing defines a substantially isothermal zone which integrates a fuel cell and a tail gas burner with the isothermal zone. The fuel cell and the tail gas burner are in thermal communication and share a common wall. In one embodiment, the housing further integrates a fuel reformer, where the fuel reformer is in thermal communication with the fuel cell. In one embodiment, the fuel cell and the tail gas burner can be arranged to produce a power density greater than or equal to about 2 W/cc. The fuel cell preferably is a solid oxide fuel cell.

24 Claims, 5 Drawing Sheets

FUEL CELL APPARATUS HAVING A SMALL PACKAGE SIZE

TECHNICAL FIELD

The invention relates to apparatus and methods that improve fuel cell efficiency. In one embodiment, the invention relates to fuel cells adapted for improving energy balance by integrating multiple fuel cell components in an isothermal zone.

BACKGROUND

Fuel cells that operate in conjunction with replaceable fuel canisters filled with, for example, gaseous hydrogen, methanol, butane or diesel fuel, are a developing technology. These types of fuel cells are designed to compete with the various battery solutions that power consumer products. The competitiveness of these fuel cells with regard to batteries depends on a number of factors, such as the energy density of the fuel in the canister; the ability of the fuel cell to convert chemical energy to electrical energy with certain efficiencies; and the need to keep the fuel cell stack, along with associated fluid pumping and power control components, no larger than that of a competitive battery.

Improvements in energy density and chemical conversion efficiency have been achieved with solid-oxide-fuel cells (SOFCs), which utilize ceramic membranes instead of polymer membranes. Because solid-oxide fuel cells can convert a variety of different molecular fuel types into electricity, e.g., various hydrocarbons, a solid-oxide fuel cell can utilize energy dense liquid fuels and still achieve suitable energy conversion efficiencies.

However, solid-oxide fuel cells, require membrane and catalytic operation at temperatures in excess of 600° C., often in excess of 750° C. Consequently, designers of solid-oxide fuel cells for portable power applications must protect the end user from the extreme heat without adding excessively to the size of the overall system. Additionally, a present day solid-oxide fuel cell operating at 800° C. can easily radiate or transmit ten times more energy to the environment as waste heat than the electrical energy delivered to the user. Such a system cannot be more than 10% efficient, i.e., the system uses more than 90% of the fuel energy for the sole purpose of maintaining the reactor's 800° C. operating temperature. Therefore, with such low efficiency, it is unlikely for current solid-oxide fuel cells to compete with batteries.

State-of-the-art portable solid-oxide fuel cells have not been able to achieve similar volumes to batteries. Solid-oxide fuel cell generator, without insulation, rarely exceeds 0.35 watts per cubic centimeter (W/cc). Upon adding insulating layers with thickness sufficient for energy efficient operation, most conventional solid-oxide fuel cells provide power to volume ratios below 0.1 W/cc.

Additionally, existing fuel cell apparatus and systems designs provide heated components (other than the solid-oxide fuel cell stack) to improve the efficiency of the system. However, each heated component adds to the volume of the apparatus and to the amount of insulation required to avoid excessive heat dissipation.

As a result, there exists a need to build a miniature fuel cell apparatus, which when combined with a portable fuel canister, can provide energy storage capacities similar to or exceeding that of rechargeable batteries, e.g., greater than 200 Watt-hours per liter (W-hr/L), and preferably greater than 400 W-hr/L. A fuel cell would be of great value for powering portable electronics, whose functions today are often limited by the energy capacity of batteries.

SUMMARY OF THE INVENTION

Fuel efficiency is achieved, in part, by regulating thermal efficiency. Specifically, improved thermal efficiency results, in part, from any one or a combination of the following factors: integration of the fuel reformer, fuel cell, and tail gas burner into a single, essentially isothermal, zone of high temperature; substantially reducing the heat dissipation area of the hot zone by increasing the power density in the fuel cell stack, preferably to values in excess of 2 W/cc; use of an efficient (either aerogel or vacuum) means of thermal insulation such that all of the components requiring high temperature operation are contained within a single housing and whereby such thermal insulation is disposed exterior to such housing; incorporation of low-thermal conductance connections for exchanging fluids between the fuel cell apparatus and the outside world and for the extraction of electrical currents from the fuel cell; and/or incorporation of a heat recuperator, preferably located within the thermal insulation zone, such that the heat recuperator can operate at a temperature intermediate between the temperature of the hot zone and the outside ambient.

As used herein, "fuel cell apparatus" and "fuel cell systems" refer to an apparatus or device that can contain some or all of the following components: a fuel reformer, a tail gas burner, anode/electrolyte/cathode elements, pumps, and controls. However, "fuel cell" refers to the anode/electrolyte/cathode membrane structure. In addition, "power density" refers to a ratio of the power generated in a given volume and as otherwise understood in the fuel cell art.

Although, the invention relates to different aspects and embodiments, it is understood that the different aspects and embodiments disclosed herein can be integrated together as a whole or in part, as appropriate. Thus, each embodiment disclosed herein can be incorporated in each of the aspects to varying degrees as appropriate for a given implementation. Furthermore, although some aspects and embodiments are described using "means for" terminology, it is understood that all aspects, embodiments, and other concepts disclosed herein can serve as support for means plus function claims, even if specific "means for" language is not used in a specific portion of the written description.

It should be understood that the terms "a," "an," and "the" mean "one or more," unless expressly specified otherwise.

In a first aspect, the invention relates to a fuel cell apparatus that includes a housing. The housing defines a substantially isothermal zone. As such, the housing integrates a fuel cell and a tail gas burner with the isothermal zone. The fuel cell and the tail gas burner are in thermal communication and share a common wall.

In one embodiment, the housing integrates a fuel reformer and the fuel reformer is in thermal communication with the fuel cell. The fuel cell and the tail gas burner are arranged to produce a power density greater than or equal to about 2 W/cc. The fuel cell is a solid oxide fuel cell. Alternatively, the solid oxide fuel cell includes a membrane layer having a thickness less than or equal to about 500 µm, about 1 mm, or about 1.5 mm in other embodiments. The solid oxide fuel cell can include a plurality of fuel cells defining a plane thereby creating an in-plane fuel cell stack. While in another embodiment, the housing includes two in-plane fuel cell stacks that are substantially parallel.

Different embodiments of the invention can include a low thermal conductance fluid connection element in fluid communication with the tail gas burner. In another embodiment, the low thermal conductance fluid connection element is a micromachined fluid conducting tube, a concentric tube, or a glass capillary tube. A low thermal conductance electrical element in electrical communication with the fuel cell is included in some embodiments of the invention. The low thermal conductance electrical element has a diameter less than or equal to about 50 μm in one embodiment. Alternatively, an insulating volume is disposed adjacent to an exterior of the housing in one embodiment. For aspects having an insulating volume, the volume can include a reduced pressure, an insulating foam, a thermal reflector, or combinations thereof. One embodiment further includes a heat recuperator in thermal communication with the fuel gas burner. Additionally, the heat recuperator can be located in the insulating volume.

In some aspects and embodiments, the fuel reformer converts complex fuels such as butane into smaller molecules for more efficient utilization by the fuel cell membrane. In some aspects the terms fuel reformer and fuel processor can be used interchangeably as known to those in the art. Additionally, in some aspects, the terms tail gas burner and catalytic converter can be used interchangeably as known to those in the art. In some aspects and embodiments, the tail gas burner burns and extracts useful heat from any fuel in the exhaust stream not already converted or consumed by the fuel cell. In some aspects and embodiments, the heat recuperator or heat exchanger extracts thermal energy from the exhaust flow of the reactor for use in pre-heating the incoming fuel and air streams for the fuel cell.

In a second aspect, the invention relates to a fuel cell apparatus that includes a fuel cell and a tail gas burner in thermal communication with the fuel cell. The fuel cell and the tail gas burner are arranged to produce a power density greater than or equal to about 2 W/cc.

In a third aspect, the invention relates to a method of minimizing heat loss during operation of a solid oxide fuel cell. The method includes the steps of providing a housing containing a fuel cell, and operating the fuel cell so the ratio of power to the volume of the housing is greater than about 2 W/cc.

In a fourth aspect, the invention relates to a fuel cell apparatus that includes a first solid oxide fuel cell and a second solid oxide fuel cell. The first solid oxide fuel cell includes an anode layer, a cathode layer, and an electrolyte layer. In turn, the second solid oxide fuel cell includes an anode layer, a cathode layer, and an electrolyte layer. In this aspect, the distance between a center line of the electrolyte layer of the first solid oxide fuel cell and a center line of the electrolyte layer of the second solid oxide fuel cell is less than or equal to about 1.5 mm or about 1 mm.

In a fifth aspect, the invention relates to a fuel cell apparatus that includes a solid oxide fuel cell and a low thermal conductance fluid connection element in fluid communication with the solid oxide fuel cell. The solid oxide fuel cell is adapted to operate at a temperature greater than or equal to about 400° C. Also, the low thermal conductance fluid connection element is designed to produce a thermal loss due to the solid cross section of the low thermal conductance fluid connection element such that the loss is less than about 0.1 watts per low thermal conductance fluid connection element.

In a sixth aspect, the invention relates to a fuel cell apparatus that includes a solid oxide fuel cell and a low thermal conductance electrical element in electrical communication with the solid oxide fuel cell. The solid oxide fuel cell is adapted to operate at a temperature greater than or equal to about 600° C. and the low thermal conductance electrical element has a resistance greater than or equal to about 0.5 ohms. In one embodiment, the low thermal conductance electrical element includes platinum and has a diameter less than or equal to about 200 μm or about 100 μm.

In a seventh aspect, the invention relates to an apparatus. The apparatus includes a housing containing a solid oxide fuel cell and an insulating volume disposed adjacent to an exterior of the housing. The insulating volume is at a reduced pressure.

In an eighth aspect, the invention relates to an apparatus. The apparatus includes a housing containing a solid oxide fuel cell, an insulating volume disposed adjacent to an exterior of the housing, and a heat exchanger in thermal communication with the solid oxide fuel cell. The heat exchanger is located in the insulating volume.

In a ninth aspect, the invention relates to an apparatus. The apparatus includes a solid oxide fuel cell and a low thermal conductance fluid connection element in fluid communication with the solid oxide fuel cell. The solid oxide fuel cell is adapted to operate at a temperature greater than or equal to about 400° C. The low thermal conductance fluid connection element is designed to produce a thermal loss due to its solid cross section that is less than about 0.1 watts per low thermal conductance fluid connection element.

In a tenth aspect, the invention relates to an apparatus. The apparatus includes a solid oxide fuel cell and a low thermal conductance electrical element in electrical communication with the solid oxide fuel cell. The solid oxide fuel cell is adapted to operate at a temperature greater than or equal to about 400° C. and the low thermal conductance electrical element has a resistance greater than or equal to about 0.5 ohms. In certain embodiments, the low thermal conductance electrical element comprises platinum and/or has a diameter less than or equal to about 200 μm.

In an eleventh aspect, the invention relates to a fuel cell apparatus that includes a housing containing a solid oxide fuel cell and an insulating volume disposed adjacent to an exterior of the housing. The insulating volume is at a reduced pressure.

In a twelfth aspect, the invention relates to a fuel cell apparatus that includes a housing containing a solid oxide fuel cell, an insulating volume disposed adjacent to an exterior of the housing, and a heat exchanger in thermal communication with the solid oxide fuel cell. The heat exchanger is located in the insulating volume.

In a thirteenth aspect, the invention relates to a fuel cell apparatus that includes a space separation means for defining a substantially isothermal zone and for integrating elements together within a particular space. As such, the space separation means integrates a means for turning fuel into electricity and a means for burning and extracting thermal energy from any fuel within the isothermal zone. The means for turning fuel into electricity and the means for burning and extracting thermal energy are in thermal communication and share a common wall. In one embodiment, the space separation means is a housing. In another embodiment, the space separation means is an outer wall. In yet another embodiment, the space separation means is a semiconductor structure.

The foregoing, and other features and advantages of the invention, as well as the invention itself, will be more fully understood from the description, drawings, and claims which follow.

BRIEF DESCRIPTION OF THE DRAWINGS

Reference to the figures herein is intended to provide a better understanding of the methods and apparatus of the invention but are not intended to limit the scope of the invention to the specifically depicted embodiments. The drawings are not necessarily to scale, emphasis instead being placed upon illustrating the principles of the invention. Like reference characters in the respective figures typically indicate corresponding parts.

DETAILED DESCRIPTION

The following description refers to the accompanying drawings that illustrate certain embodiments of the present invention. Other embodiments are possible and modifications may be made to the embodiments without departing from the spirit and scope of the invention. Therefore, the following detailed description is not meant to limit the present invention. Rather, the scope of the present invention is defined by the appended claims.

It should be understood that the order of the steps of the methods of the invention is immaterial so long as the invention remains operable. Moreover, two or more steps may be conducted simultaneously unless otherwise specified.

Integrated Fuel Cell Apparatus, Package, and Connections

The fuel cell apparatus embodiments described herein can produce electrical power in excess of 2 W/cc and in excess of 3 W/cc. Such fuel cell apparatus are uniquely capable of producing insulated package sizes small enough for portable application, even though the power ratings are below 100 watts, below 20 watts, or below 5 watts. In contrast, existing fuel cell designs only generate power densities typically below 0.5 W/cc. As a result, the low power density fuel cells are too large and not efficient enough for many applications such as, for example, consumer battery substitutes.

The power density (W/cc) depends primarily upon the design of the integrated fuel cell apparatus and the individual fuel cell or fuel cell stack (plurality of individual fuel cells). In particular, the level of proximal integration of the various fuel cell apparatus components within the housing is an important design factor. As a result, fuel cell apparatus efficiency can be a function of how close the various fuel cell membranes can be placed subject to the constraints of mechanical strength and fluid routing. Many of the aspects and embodiments described herein relate to component integration within one thermal region and related techniques to control thermal losses. The use of semiconductor structures in many of the embodiments disclosed herein enables the small sizes and high energy densities that allow for fuel cell apparatus that can compete with various battery types.

Figure 1:
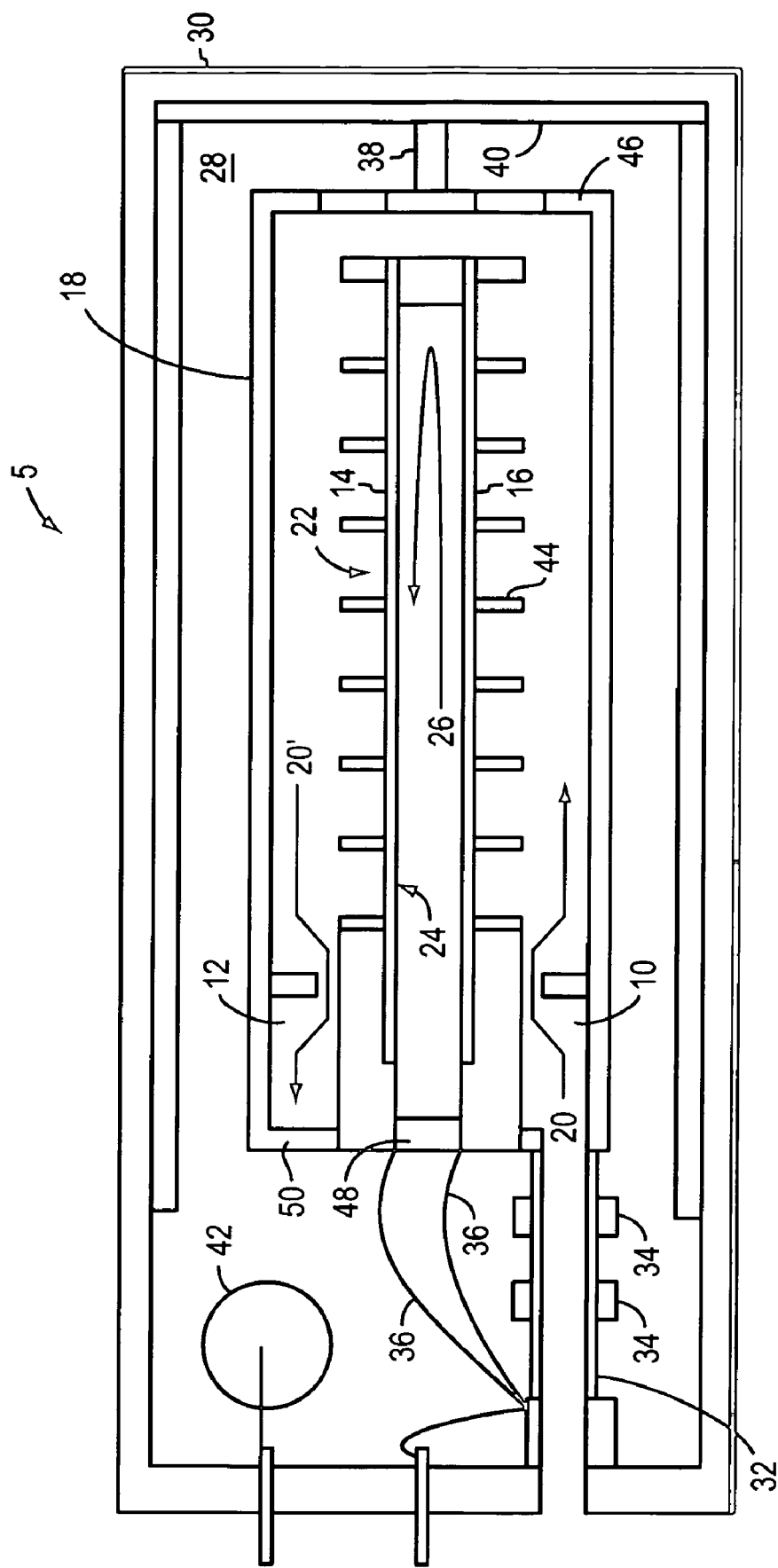
FIG. 1 is a cross-sectional side view of a fuel cell apparatus according to an illustrative embodiment of the invention.

FIG. 1 shows one example of a fuel cell apparatus 5, in cross-sectional view. FIG. 1 illustrates a fuel reformer 10, a pair of solid oxide fuel cell membranes 14 and 16, and a tail gas burner 12 all contained within a single housing 18. The housing is made of a thermally conductive material such that all of the components within the housing can operate at substantially the same temperature. Thus, the housing facilitates the formation of a zone that is substantially isothermal.

The housing 18 in FIG. 1 includes within it all of the flow routing means for distributing fuel and air to the fuel cell(s). The fuel stream 20 passes out of the fuel reformer 10, along the anode side of the first fuel cell 16. The fuel stream 20' then passes along the anode side 22 of the second fuel cell 14 and finally into the tail gas burner 12. The air stream 26 passes (by means of internal routing channels not shown) along the cathode side 24 of the fuel cells 14, 16 and culminates into the tail gas burner 12 where the excess air is available for the combustion of unused exhausted fuel. (The air entrance to the tail gas burner does not appear in FIG. 1.)

Also shown in FIG. 1 is an insulating volume 28, which separates the housing 18 from an outer wall 30 of the apparatus 5. The outer wall is substantially maintained at a temperature that is at or near the ambient temperature of the electrical device powered by the fuel cell apparatus. For efficient operation of a solid oxide fuel cell apparatus, the temperature within the housing should be greater than 400° C., with better operating efficiencies obtained if the temperature is maintained in excess of 550° C., 600° C., or 750° C. The ambient temperatures of external electrical circuits and the outer wall 30 of a fuel cell apparatus will typically be in the range of 0° C. to about 60° C. Therefore, in this embodiment, a large thermal gradient in excess of 300° C. is desirably maintained not only through the thickness of the intervening insulating volume 28, but also along fluidic connections 32, electrical connections 36, and along mechanical supports 38.

The insulating volume can incorporate insulation to substantially reduce heat dissipation from the housing. Thus, a partial vacuum can be formed, within the insulating volume or a low thermal conductance material can be added to the insulating volume. An infrared radiation shield 40 can also be disposed within or upon the fuel cell apparatus. It is beneficial to maintain the required low level of total gas pressure in the insulating volume when fabricating a low pressure or vacuum insulation embodiment. For this purpose, it is useful to add a getter material 42 which has the capability of absorbing background gases and maintaining high levels of vacuum over the operating life of the device. A non-evaporable getter, which can be activated through electrical heating, is useful for this purpose, such as the SAES getters ST 171 device (www.saesgetters.com).

The integrated fuel cell contained within a housing can have a total thickness of 2.5 mm (0.25 cm). In FIG. 1, two fuel cell layers 14 and 16, and three routing layers 46, 48, and 50 are present, each with 0.5 mm thickness. Each of the two fuel cell layers is capable of producing 0.4 W/cm$^2$ of electrical power. As a result, an exemplary integrated fuel cell apparatus is capable of delivering (2*0.4 W/cm$^2$)/0.25 cm=3.2 W/cc of power density.

The housing, which integrates the functions of a fuel reformer, a set of fuel cell membranes, a tail gas burner, and all internal fluid manifolds in one thermal zone, can be fabricated through any number of fabrication techniques. In particular, embodiments of the invention can be fabricated using MEMS techniques (micro-electro-mechanical systems) or micromachining techniques. Such techniques make it possible to integrate thin film materials (for instance thin film electrolytes, anodes, cathodes and/or electrical connections) along with etched microchannels for control of fluid flow onto a common substrate that is thermally conductive and mechanically robust. Structural support members 44 are included in some embodiments (as shown FIG. 1) as they are useful for patterning either anodes or cathodes into discrete regions. Individual membranes electrode assemblies and fluid manifolds can be stacked together by a variety of bonding techniques, to create fluid processing "systems."

For example, an integrated housing can be assembled from a group of substantially planar or non-planar semiconductor structures. Specifically, five silicon substrates can be bonded together to form the "box" that various fuel cell apparatus components are integrated within. Bonding together the five silicon substrates, results in a stacked configuration. In one embodiment, the substrates can be stacked as follows: (1) fuel processor substrate including fluidic interconnects; (2) a membrane electrode assembly, (3) a fluid routing layer, (4) another membrane electrode assembly, and (5) a top fluid routing layer including tail gas burner. Thus, a stack of layers can form some or all of the integrated fuel cell apparatus.

In a preferred embodiment, silicon is chosen as the substrate for building the fuel cell membranes and other manifold structures. However, micromachining techniques also exist for building fluid flow channels in rigid wafers of glass and ceramic, all materials which possess the high temperature strength required for solid oxide fuel cells. In order to prevent electrical shorting between different points of the membrane assembly, a silicon substrate can be coated with layers of silicon oxide or silicon nitride to render it electrically insulating.

Etched fluidic microchannels are formed in the above substrates by a variety of techniques, including wet and dry chemical etching, laser ablation, diamond milling, tape casting, or injection molding. A variety of substrate or wafer bonding techniques are available including fusion bonding, anodic bonding, sealing by means of eutectic solder materials or thin films, or sealing by means of glass frits.

Fuel cell assemblies, including the anode, cathode, and electrolyte can be deposited by a variety of thin and thick film deposition techniques including sputtering, evaporation, chemical vapor deposition, laser ablation, screen-printing, dip coating, or vapor spray techniques.

The preferred material for the electrolyte is yttria-stabilized zirconia (YSZ), although a variety of doped ceria materials are also available for this purpose. The preferred material for the anode of the fuel cell is a cermet of nickel and YSZ, although other catalytic metals may be employed such as Pt, Pd, Fe or Co, and other oxide matrix materials can be used such as ceria. The preferred material for the cathode of the fuel cell is lanthanum (strontium) manganate (LSM), although other cathode materials have been described including lanthanaum (strontium) cobaltite (LSC) and lanthanum (strontium) cobalt-ferrite (LSCF). The preferred material for thin film electrical connections in the fuel cell is platinum, although lanthanum chromite has also been described for this application.

Figure 2:
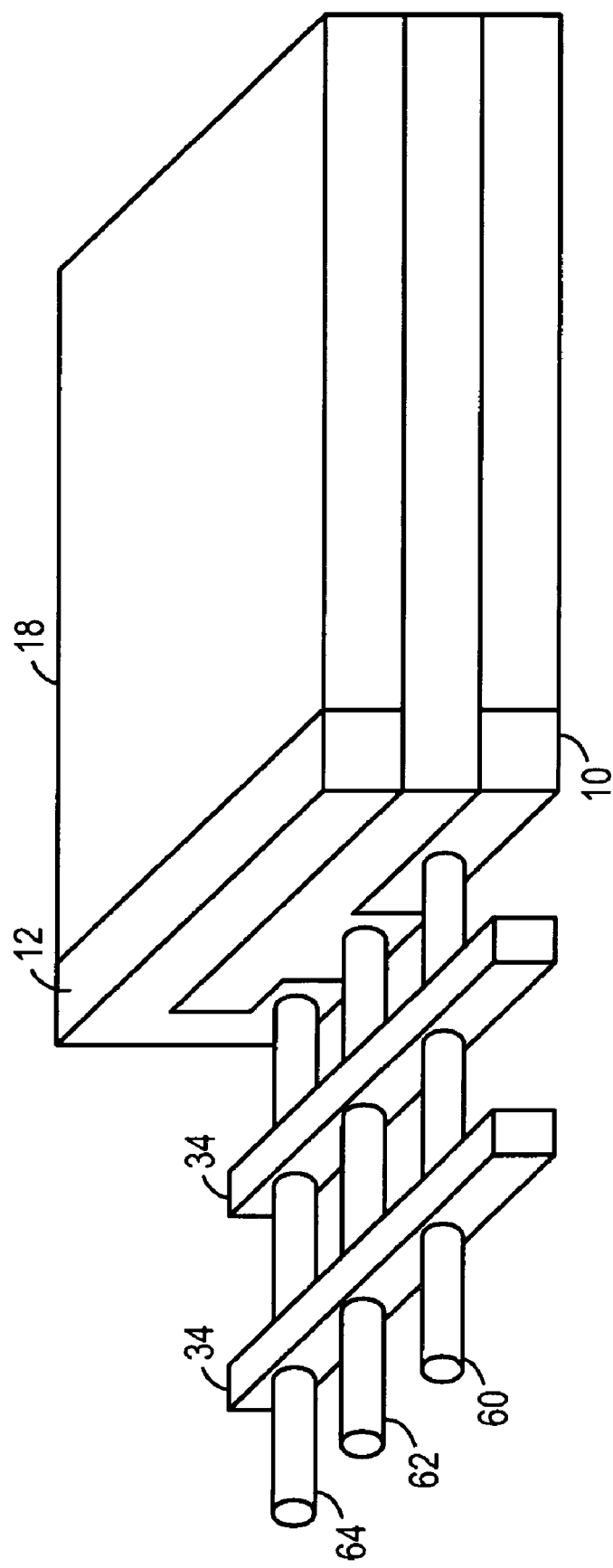
FIG. 2 is a perspective view of a fuel cell apparatus component having fluidic connections and a heat recuperator according to an illustrative embodiment of the invention.

FIG. 2 is a further illustration of the fuel cell apparatus of FIG. 1, emphasizing the arrangement of fluidic connections and a heat recuperator 34. The integrated fuel cell apparatus' housing 18 is shown only in its external aspect, with sub-regions denoting the suggested placement of a fuel reformer 10, and a tail gas burner (or catalytic converter) 12. A mixture of fuel and air enters along an inlet tube 60 directly to the fuel reformer 10. After which, by means of internal routing channels, the reformed fuel passes by the anode of the fuel cell, eventually ending up in the region of the tail gas burner 12. Air for the cathode of the fuel cell enters through an inlet tube 62 and flows internally via a controlled route to the cathode of the fuel cell. Both air and fuel streams are finally re-united in the tail gas burner 12 for extraction of any residual heat of oxidation before exiting the hot zone through an exit tube 64.

The inlet and outlet tubes bridge the region between the housing and the cold outer wall and should be designed for low thermal conductivity. As an example, these tubes can be composed of silicon nitride, preferably with wall thickness of 5 microns or less, such as are described International Publication No. WO 03/013729. Alternatively, the tubes can be made from silica glass capillaries. For example, glass capillaries are available with 1 mm outer diameters and wall thicknesses of only 125 microns. The thermal power that will be conducted along such capillaries if they are 5 mm long and span a temperature gradient of 800° C. is only 0.05 watts.

It will be recognized by those skilled in the art that other arrangements of the fuel reformer and tail gas burner within the housing are within the scope of this invention. Similarly, other arrangements and different numbers of inlet and exit tubes are possible than those illustrated in FIG. 2. For instance, for larger fuel cell apparatus it may be preferable to add a fourth tube for delivering independent flows of fuel and air from an external flow regulation system directly into the fuel reformer. It may also be preferable to provide two independent sources of air into the cathode region, such that fluid pressure drops are more effectively managed within the fuel cell apparatus and/or as a means for controlling fuel cell voltages in local regions of the fuel cell membranes. Also, concentric tubes can also be used in certain embodiment.

Heat Recuperator

Again referring to FIG. 2, the heat recuperator 34, shown as two bars, is a means for heat recuperation and can be built as an integral part of the fluid tube assembly. The heat recuperator is typically made of a thermally conductive material, such as silicon, such that the heat of the exhaust gases passing through the exit tube 64 can be absorbed and transferred to the incoming gas streams in the inlet tubes 60 and 62.

As shown in FIG. 1, improved performance is possible by placing the heat recuperator 34 within the insulating volume 28. In this position, the various internal temperatures of the heat recuperator can be maintained intermediate between the temperature of the integrated fuel cell apparatus and the outer wall. Placing the heat recuperator within the existing insulating volume also reduces the overall system size by eliminating separate insulation around the heat recuperator. Further, aligning the thermal gradient of the heat recuperator with the exiting thermal gradient between the integrated fuel cell apparatus and the outer wall decreases the heat loss from the heat recuperator because there is little if any temperature difference between a given section of the heat recuperator and the adjacent insulating volume.

Various means of heat recuperation are possible, other than the parallel tube arrangement shown in FIG. 2. For instance, a tube-in-tube counterflow arrangement is appropriate or a stack of thin metal sheets formed to allow for a counterflow by means of machined or shaped microchannels. Many other arrangements fall within the scope of this invention, as long as the physical placement of the heat recuperator is within the intermediate region between the isothermal ("hot") zone of the fuel cell apparatus and the cold outer wall.

Low Thermal Conductance Fluid Connection

A general goal of the invention is to manage the total heat dissipation away from the housing. In one particular element, to manage the heat loss through the tubes, ($Q_{tubes}$), which accounts for the solid conduction of heat along the length of fluidic inlet and exit tubes, the heat loss through the tubes can be calculated from the product of a) the thermal conductivity of the tube wall material, b) the temperature drop along the tube, and c) the cross sectional area of the tube wall material, divided by d) the length of the tube.

For small fuel cell apparatus systems, a maximum heat loss allowed through the fluidic tubes is determined to improve system efficiency. That heat loss, $Q_{tubes}$, is desirably maintained below 0.1 watts per tube, preferably less than 0.05 watts per tube. This heat loss value is significantly below the embodiments known in the art, however, system efficiency improves dramatically when the fluidic connection tubes are constructed with heat loss below this critical value. Table 2 shows examples of typical known tube materials and design and exemplary tubes (embodiments 3 and 4) suitable for use with the present embodiments that are constructed to satisfy the critical heat loss condition.

TABLE 2

Comparison of fluid connection tube materials. (The power loss Q assumes a total temperature drop of 700° C.)

| | tube material | thermal conductivity (W/cm-k) | wall thickness (microns) | tube length/ diameter (mm/mm) | power loss per tube: Q (watts) |
|---|---|---|---|---|---|
| embodiment 1 | 1/8" stainless steel tube | 0.25 | 325 | 30/3 | 1.9 |
| embodiment 2 | stainless steel capillary | 0.25 | 125 | 20/1 | 0.35 |
| embodiment 3 | thin wall silicon nitride | 0.4 | 2 | 3/0.5 | 0.03 |
| embodiment 4 | glass capillary | 0.01 | 125 | 5/1 | 0.05 |

In a 33% efficient, 2 watt fuel cell apparatus generator, the fuel cell apparatus would be expected to burn an equivalent of 6 watts of fuel and a thermal loss of 0.1 watts per tube would represent only 5% of the total power consumed. For larger fuel cell apparatus in the range of 5 to 30 watts either more tubes or tubes with larger cross section may be necessary to handle increased amounts of fluid flow. By maintaining the thermal loss of each tube below 0.5 watts, and preferably below 0.1 watts, the percentage of thermal loss due to fluid connections can be maintained at or below 10%, and preferably below 5%, of the total power burned as fuel in the device.

Low Thermal Conductance Electrical Connection

Another general goal of the invention is to reduce the heat loss represented by solid conduction along electrical connections. In a preferred embodiment, the value of heat loss per electrical wire should be less than 0.5 watts, and more preferably less than about 0.1 watts. An electrical loss of 0.1 watts or less per wire, however, requires the use of higher resistance and finer diameter wire connections. Table 3 shows the correlation between wire diameter, wire resistance, and heat loss for known wires and those useful in the invention (embodiments 3 and 4). Note the inverse correlation between wire resistance and thermal power loss along the wire, which is typical for metal conductors. For known fuel cell systems, where stack powers are typically in excess of 100 watts and the total heat dissipated is greater than 300 watts, a loss of 1 watt per wire is not excessive. For fuel cell apparatus rated at 20 watts or less, it is desirable to reduce the heat loss due to the wires. The method employed in this invention for controlling heat loss is to choose electrical connections where the electrical resistance is in excess of 0.1 ohms and preferably greater than 0.5 ohms.

TABLE 3

Comparison of electrical connection wires. (The temperature drop along the length of wire is assumed to be 700° C.)

| | wire material | wire diameter (microns) | wire length (mm) | wire resistance (ohms) | power loss per wire (watts) |
|---|---|---|---|---|---|
| embodiment 1 | Cr/Ni alloy | 800 | 30 | 0.1 | 0.34 |
| embodiment 2 | Pt | 800 | 30 | 0.02 | 1 |
| embodiment 3 | Cr/Ni alloy | 100 | 5 | 1.27 | 0.03 |
| embodiment 4 | Pt | 50 | 5 | 0.81 | 0.02 |

From Table 3 choosing connecting wires for bridging the insulation space where the resistance of the wires exceeds 0.5 ohms is advantageous. To achieve an efficient fuel cell apparatus with this constraint, however, requires other changes to the fuel cell apparatus operating parameters and to the construction of the fuel cell stack. For instance, output currents must be maintained at a levels low enough to prevent excessive electrical power loss by means of resistance in the connecting wires. Thus, using the techniques disclosed herein, currents can be reduced at any given power level by increasing the fuel cell voltage. However, in the past, this objective was achieved by connecting or stacking individual fuel cells in series such that voltages are added. For this invention, which deploys connector wires in excess of 0.5 ohms, a stacked output voltage in excess of 10 volts is required, preferably in excess of 15 volts.

One method for voltage stacking is an in-plane stacking, arrangement, in which fuel cell membranes layers are stacked vertically such that the anode of one cell makes electrical contact with the cathode of the cell directly above it. A 10 volt output requirement for the fuel cell stack would require that twelve to twenty fuel cell membrane layers be assembled in the vertical stack The embodiment illustrated in FIG. 1, however, depicts only two membrane layers due to volume efficiency. Nevertheless, an advantageous output voltage is possible using the in-plane stacking concept disclosed herein.

Figure 3:
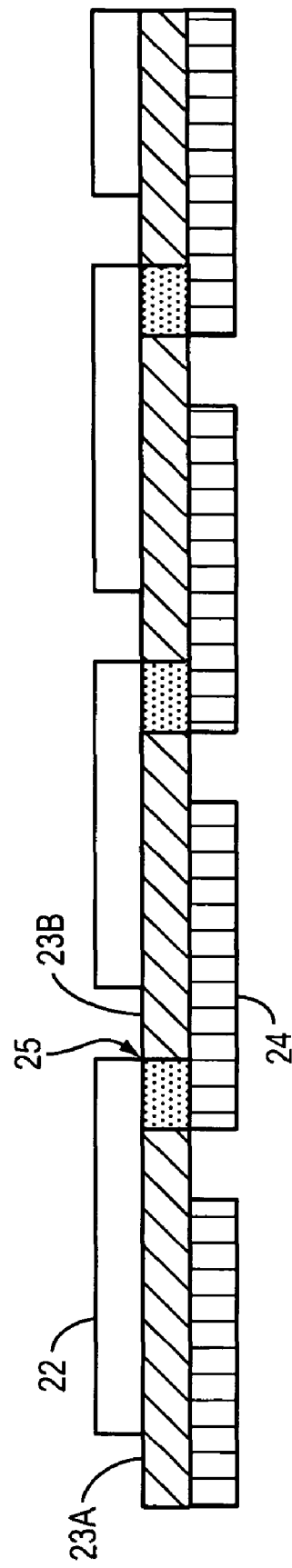
FIG. 3 is a schematic drawing of anodes, cathodes, and electrolytes arranged in a configuration suitable for use in the fuel cell apparatus according to an illustrative embodiment of the invention.

FIG. 3 illustrates the concept of in-plane stacking. In-plane stacking requires the ability to pattern anodes, cathodes, and electrolytes such that series type voltage connections can be made. In FIG. 3, in anode 22 of fuel cell electrolyte 23A is allowed electrically to contact a cathode 24 that is disposed behind an adjacent fuel cell electrolyte 23B. An interconnect material 25 allows for a low resistance electrical connection between anode 22 and cathode 24. Structural support members 44 shown in FIG. 1 are also useful for patterning either anodes or cathodes into discrete regions.

Given the compact nature of the integrated fuel cell apparatus shown in FIG. 1, and the goal that electrical connections be achieved with narrow gauge wires (diameters less than about 100 microns), it is also desirable to provide a reliable method for attaching the connector wires without the use of bulky screws or crimp connectors. In one embodiment, the narrow gauge wires should be attached to both the integrated fuel cell apparatus and the connector strip at the outer wall by means of a high temperature brazing alloy or preferably by bonding methods such as a thermo-mechanical bond.

Isothermal Nature of Integrated Fuel Cell Apparatus

The efficiency of a solid-oxide fuel cell apparatus improves when all the functions of fuel reformer, fuel cell and tail gas burner integrate into a single housing with minimum surface area. Efficiency also improves when the housing is designed with sufficient thermal conductivity to enable an efficient distribution of heat or sharing of thermal energy between components. In particular, the tail gas burner can be used to share supplemental heat that improves overall efficiency. Thus, the thermal energy generated in the tail gas burner maintains a higher and more efficient operating temperature in the fuel cell apparatus. In this fashion, the thermal stresses and costs associated with heat up or cool down of the device are reduced.

Furthermore, improved fuel cell efficiency is possible by operating the fuel cell at higher voltages, closer to an equilibrium electrochemical potential. Such an operating condition implies the generation of less waste heat when compared to operating at a lower fuel cell voltage. The required amount of thermal energy for maintaining operating temperature is attainable by extracting heat from the combustion of under-utilized fuels in the tail gas burner.

Several methods can be employed to maintain sufficient thermal conductivity and nearly isothermal operation between components within the integrated fuel cell apparatus. Silicon, used as a substrate material is an excellent thermal conductor at elevated temperatures. Glass or ceramic substrates are suitable material choices based on thermal conductivity, as long as their resultant wall thicknesses are substantially in excess of 100 microns and preferably in excess of 300 microns. The thermal conductivity of glass substrates is enhanced by the deposition of metallic thin films over areas that are not electrically active, such as the outer surfaces of the housing. Candidate thermally conductive metal coatings include chromium, gold, and platinum.

As a means of enabling the substantially isothermal operation of the system, it is helpful to design the integrated housing such that separate components (fuel reformer, tail gas burner and the fuel cell membranes) share between any pair of them at least one common structural wall. This wall could be an outer wall of the housing or it could be an internal wall formed, for instance through the bonding of individual substrates.

By sharing structural walls and by providing substrates with sufficient thermal conductivity, it is possible to maintain any temperature differences between components during operation to less than 150° C., preferably less than 50° C.

Power Density

When designing a portable solid-oxide fuel cell apparatus, it is important to determine a minimum thickness of insulation material that is adequate for maintaining high operating temperatures without excessive consumption of fuel energy. The amount of heat that will dissipate from an integrated fuel cell apparatus is proportional to its surface area. An integrated fuel cell apparatus designed for a 5 watt application, therefore, becomes difficult to insulate efficiently since its surface-to-volume ratio is much higher than an integrated fuel cell apparatus designed for applications at 20 watts or more.

The power density of the integrated fuel cell apparatus is a significant design parameter. In particular, the power density may be the design parameter that most influences the final efficiency and size of the insulated package. The power density of the integrated fuel cell apparatus, expressed in watts per cubic centimeter (W/cc), determines how much surface area is exposed for every watt of electricity produced. As a result, the influence of integrated fuel cell apparatus electrical power density on final package size is large and disproportionate. For example, an integrated fuel cell apparatus which is capable of producing power at 5 watts and 1 w/cc will require a package size, including insulation, of 66 cc. In contrast, an integrated fuel cell apparatus rated at 5 watts and 2 w/cc can be insulated inside of a package of only 17.8 cc. Therefore, a two-fold increase in power density results in a 3.7 times decrease in package size with no loss in thermal efficiency. (This example assumes the use of an aerogel™ insulation rated at 0.04 W/m-K, maintaining a temperature drop of 800° C.)

Figure 4:
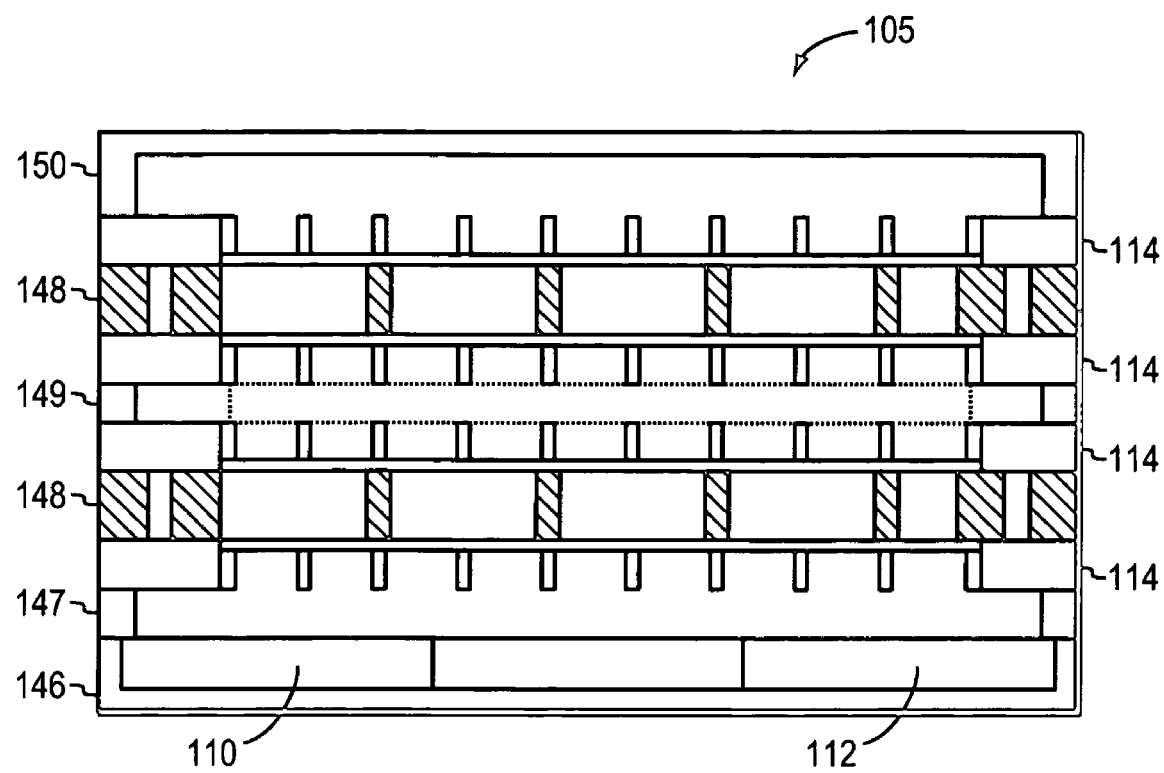
FIG. 4 is a cross-sectional side view of another fuel cell apparatus according to an illustrative embodiment of the invention.

FIG. 4 shows another embodiment of the present invention, in this case a larger fuel cell apparatus 105 employing four different membrane layers. Each layer, whether a fuel cell membrane 114, an air or oxygen routing layer 148, or fuel routing layer 147, 149, 150, is about 0.5 mm or less of thickness, such that the total stack is about 4.8 mm in height. FIG. 4 also includes within its housing a fuel reformer 110 and a tail gas burner 112 constructed as part of layer 146. The fuel routing layers carry fuel out of the fuel reformer past their respective fuel cell membranes and/or carry exhaust into the tail gas burner after passing their respective fuel cell membranes. Using FIG. 4, the average spacing between membrane layers, defined as the total integrated fuel cell apparatus height (4.8 mm) divided by the number of membrane layers (4) can be calculated. The average membrane spacing of FIG. 4 is therefore about 1.2 mm. In this case the power density can be derived by dividing the average power density of each fuel cell layer (0.4 W/cm2) by the average membrane spacing, resulting in a power density of about 3.3 W/cc.

Construction of the fuel cells stack to enable greater than about 2 watts of electrical energy per cubic centimeter of integrated fuel cell apparatus volume is preferable. It is also desirable to operate a given fuel cell stack in such a way to produce greater than 2 W/cc. The power produced by a fuel cell can be controlled by varying the voltage, as well as by varying the temperature of the fuel cell. Larger fuel cells are typically operated at voltages above maximum power in order to increase the efficiency of the chemical to electrical energy conversion. Power densities greater than 1 W/cc, 1.5 W/cc, or preferably 2 W/cc, are included in the present invention.

Increasing the voltage to a level which lowers the power out below about 2 W/cc actually lowers overall system efficiency in small systems because insufficient heat is produced to maintain the required temperatures. The integration of a catalytic converter or tail-gas burner allows for some decrease in fuel cell power output.

One significant power density improvement is achieved through closer vertical spacing between membranes. The average spacing between membranes in the existing art is in the range of 2.5 to 4 mm, while the average spacing in the invention typically is less than about 1.5 mm, approaching values as small as 1.0 mm. The advantage of closer membrane spacing is derived from two advantageous structural features: a) the use of mechanically robust composite membrane designs, and b) the use of structurally simple flow routing layers that are enabled by the use of in-plane stacking. In this embodiment, advantageous use is also made of the architecture of in-plane fuel cell stacking. In-plane fuel cell stacking makes possible a number of structural advantages that together act to reduce the spacing between membranes and increase the power density to values well in excess of 2 W/cc.

The use of composite membrane structures has been described in co-owned International Publication No. WO 2005/030376. Briefly, composite membrane structures make possible the combination of a strong structural support member in combination with thin (<2 μm) YSZ membrane layers. Such a structure has the strength to withstand the stresses of thermal cycling without the need for excess substrate thickness and can be achieved using silicon wafer thicknesses of about 0.5 mm or thinner. Similar composite structures can be built from dense ceramic substrates, for instance $Al_2O_3$ materials, regardless of coefficient of thermal expansion, to the extent that they obey the design rules laid-out in the above-identified patent application.

In known layer fabrication techniques, a gas-impermeable bipolar plate is required to separate gas flows between fuel and air. A vertical planar stack requires that electrical contact be made from the anode of one membrane layer to the cathode of the adjacent layer. However, the fuel that passes over the anode must not be allowed to mingle with the air that flows over the cathode. Therefore an electrically conductive bipolar plate is typically employed which effects not only the electrical connection between layers but also the routing of fuel to the anode, air to the cathode, and a hermetic separation between the gas flows.

Returning to FIG. 1, no such gas separation is required in the flow routing layers as the cathode of fuel cell membrane 14 directly faces the cathode of fuel cell membrane 16. Both membrane layers share the same gas flow and no electrical connection is required between these two fuel cell layers. Therefore, the design of the flow routing layer is simplified and extremely thin flow routing layers are possible, with thicknesses in the range of 0.3 to 0.5 mm.

Figure 5:
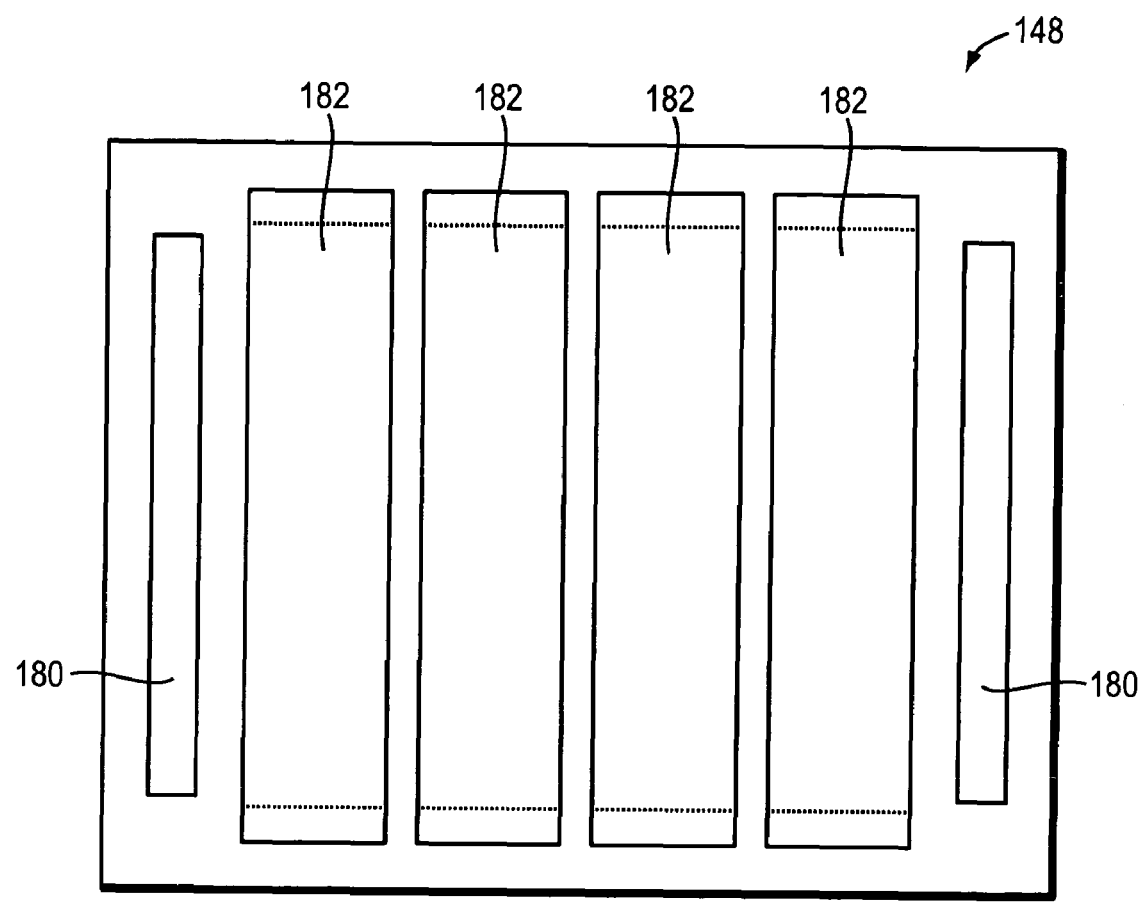
FIG. 5 is a schematic drawing of flow routing layer suitable for use with a fuel cell apparatus according to an illustrative embodiment of the invention.

FIG. 5 illustrates one such flow routing layer, having geometry compatible with the four layer fuel cell stack shown in FIG. 4. Openings 180 provide for vertical passage of the fuel from one layer of the stack to layers above or below. Channels 182 provide for the flow of air over the cathode. To the extent that flow routing layer 148 separates two cathode-facing layers, only a simple ribbed structure is necessary to add both structural rigidity to the stack and provide for sufficient distribution of air over all cathode surfaces.

The flow routing layer can be composed of a rigid material such as silicon. Choice of silicon in this embodiment has the further advantage of matching the structural materials between all of the membrane layers and the flow routing layers. In this fashion, one can avoid the stresses associated with differing thermal expansion coefficients between these two structural materials.

The flow routing layer can be machined or stamped from a metallic material. However, the coefficient of thermal expansion of the flow routing layer must remain substantially similar to that of the structural material in the membrane layer. Thin metallic flow routing layers will not be as rigid as a routing layer built from silicon, but the silicon or other ceramic material employed for the membrane layer will provide more than enough rigidity and provide sufficient strength to the overall stack to withstand the stresses of thermal cycling.

Heat Generation/Insulation

In addition, to maintaining electrical power output above about 2 W/cc, system performance and size are also improved if the thermal heat generated is maintained above 2 W/cc. Due to the rapidly increasing surface area at the small sizes, it is desirable to maintain a sufficiently high heat density in order to maintain the operating temperature of the device. If the fuel cell apparatus alone does not produce enough heat, using a tail gas burner to combust extra fuel in order to maintain greater than 2 W heat per cubic centimeter is advantageous for efficient device operation. Ensuring that the device will be operated at greater than 2 W heat per cubic centimeter allows the insulation thickness to be minimized, thereby producing a device which is commercially competitive with existing batteries.

Design of the insulation volume in the solid-oxide fuel cell system is another area for improving solid-oxide fuel cell efficiency. Fibrous or micro-porous ceramics have been utilized for the function of isolating the high temperature housing from the outer package and its environs while minimizing the amount of waste heat that is lost by conduction through the insulation. Aerogel materials are available, for instance, which possess low thermal conductivities and are stable for operation at 800° C. as low as 0.04 W/m-K.

Perhaps the most space-efficient insulation, particularly for small packages, is a vacuum insulation. This allows portions of the fuel cell apparatus to function as a thermos bottle with the outer walls and insulating volume maintaining the contents integrated within the housing at a desired temperature. By maintaining total gas pressures in the insulating volume of less than 100 mtorr, preferably less than 20 mtorr, more preferably less than 10 mtorr, it is possible to substantially eliminate any thermal loss by means of conduction away from the housing through the gas phase. A partial vacuum may be formed within the insulating volume bounded by the outer wall by evacuation with a vacuum pump, through an outgassing port, or alternatively, by performing the process of sealing-together the elements of the outer wall within an evacuated atmosphere.

When utilizing the embodiment of a vacuum package, and eliminating use of a thicker solid insulation material such as aerogel, a new type of thermal loss from the housing becomes an issue in the form of thermal loss by means of infrared radiation. Infrared radiation emanating from the surfaces of the housing can become, in fact, the dominant heat loss mechanism for the insulation package illustrated in FIG. 1.

There are at least three methods for reducing the thermal loss by radiation, any one of which may be used singly or in combination. These can be seen by returning to FIG. 1. First, a reflective coating is applied to the outer surfaces of the integrated fuel cell apparatus, reducing thereby the infrared emissivity and power loss from the hot surface. Second, a radiation reflector 40 can be provided along the inner surfaces of the vacuum outer wall 30 for the purposes of returning infrared radiation back to the integrated fuel cell apparatus. This radiation reflector can be constructed by means of a metallic coating which is deposited on the inner surfaces of the outer wall 30, or by means of a metallic or infrared reflective material which is mechanically attached to the inner surfaces of the vacuum wall. In addition, a series of parallel infrared reflectors can be provided between the hot surface of and the cold surface of the outer wall.

The invention may be embodied in other specific forms without departing from the spirit or essential characteristics thereof. The foregoing embodiments are therefore to be considered in all respects illustrative rather than limiting on the invention described herein. Scope of the invention is thus indicated by the appended claims rather than by the foregoing description, and all changes which come within the meaning and range of equivalency of the claims are intended to be embraced therein.

Each of the patent documents and scientific publications disclosed hereinabove is incorporated by reference herein for all purposes.

What is claimed:
1. An apparatus comprising:
 a housing having at least one wall formed from a thermally conductive material, the at least one wall having a thickness in excess of 100 μm, the housing integrating:
  a solid oxide fuel cell comprising a membrane layer, the membrane layer including a plurality of fuel cells arranged in an in-plane stack; and
  a tail gas burner in thermal communication with the solid oxide fuel cell and sharing at least one wall with the housing;
 an insulating volume disposed adjacent to an exterior of the housing, the insulating volume including at least a partial vacuum;

an infrared radiation shield disposed adjacent to an exterior of the housing; and a package containing the housing, the insulating volume, and the radiation shield, the package size being no greater than 66 cc.

2. The apparatus of claim 1, wherein the housing integrates a fuel reformer and the fuel reformer is in thermal communication with the solid oxide fuel cell.

3. The apparatus of claim 1, wherein the solid oxide fuel cell and the tail gas burner are arranged to produce an electrical power density greater than or equal to about 2 W/cc.

4. The apparatus of claim 1, wherein the membrane layer has a thickness less than or equal to about 500 μm.

5. The apparatus of claim 1, wherein the housing comprises two in-plane fuel cell stacks which are substantially parallel.

6. The apparatus of claim 1, comprising a low thermal conductance fluid connection element in fluid communication with the tail gas burner.

7. The apparatus of claim 6, wherein the low thermal conductance fluid connection element is at least one of a micromachined fluid conducting tube, a concentric tube, and a glass capillary tube.

8. The apparatus of claim 1, comprising a low thermal conductance electrical element in electrical communication with the solid oxide fuel cell, the low thermal conductance electrical element having a diameter less than or equal to about 100 μm.

9. The apparatus of claim 8, wherein the low thermal conductance electrical element has a diameter less than or equal to about 50 gm.

10. The apparatus of claim 1, further comprising a heat recuperator in thermal communication with the tail gas burner.

11. The apparatus of claim 10, wherein the heat recuperator is located in the insulating volume.

12. The apparatus of claim 1, wherein the membrane layer further comprises:
 a first membrane layer comprising an anode layer, a cathode layer, and an electrolyte layer; and
 a second membrane layer comprising an anode layer, a cathode layer, and an electrolyte layer;
 wherein the distance between a center-line of the electrolyte layer of the first membrane layer and a center line of the electrolyte layer of the second membrane layer is less than or equal to about 1.5 mm.

13. An apparatus comprising:
 a housing having at least one wall formed from a thermally conductive material, the at least one wall having a thickness in excess of 100 μm, the housing integrating:
  a solid oxide fuel cell comprising a membrane layer, the membrane layer including a plurality of fuel cells arranged in an in-plane stack;
  a tail gas burner in thermal communication with the solid oxide fuel cell and sharing at least one wall with the housing; and
  a low thermal conductance fluid connection element in fluid communication with the tail gas burner;
 an insulating volume disposed adjacent to an exterior of the housing, the insulating volume including at least a partial vacuum;
 an infrared radiation shield disposed adjacent to an exterior of the housing; and
 a package containing the housing, the insulating volume, and the radiation shield, the package size being no greater than 66 cc.

14. An apparatus comprising:
 a housing having at least one wall formed from a thermally conductive material, the at least one wall having a thickness in excess of 100 μm, the housing integrating:
  a solid oxide fuel cell comprising a membrane layer, the membrane layer including a plurality of fuel cells arranged in an in-plane stack;
  a tail gas burner in thermal communication with the solid oxide fuel cell and sharing at least one wall with the housing;
  a low thermal conductance electrical element in electrical communication with the solid oxide fuel cell;
 an insulating volume disposed adjacent to an exterior of the housing, the insulating volume including at least a partial vacuum;
 an infrared radiation shield disposed adjacent to an exterior of the housing; and
 a package containing the housing, the insulating volume, and the radiation shield, the package size being no greater than 66 cc.

15. The apparatus of claim 14, wherein the low thermal conductance electrical element has a diameter less than or equal to about 100 μm.

16. The apparatus according to claim 13, wherein the solid oxide fuel cell is adapted to operate at a temperature greater than or equal to about 400° C. and the low thermal conductance fluid connection element is designed to produce a thermal loss, due to the solid cross section of the low thermal conductance fluid connection element, of less than about 0.1 watts per low thermal conductance fluid connection element.

17. The apparatus according to claim 13, wherein the low thermal conductance fluid connection element is at least one of a micromachined fluid conducting tube, a concentric tube, and a glass capillary tube.

18. The apparatus according to claim 13, wherein the low thermal conductance fluid connection element has a length no greater than 5 mm.

19. The apparatus according to claim 14, wherein the solid oxide fuel cell is adapted to operate at a temperature greater than or equal to about 400° C. and the low thermal conductance electrical element has a resistance greater than or equal to about 0.5 ohms.

20. The apparatus of claim 15, wherein the low thermal conductance electrical element comprises platinum.

21. The apparatus of claim 15, wherein the low thermal conductance electrical element has a diameter less than or equal to about 50 μm.

22. The apparatus of claim 1, wherein the solid oxide fuel cell and the tail gas burner share a common wall.

23. The apparatus of claim 13, wherein the solid oxide fuel cell and the tail gas burner share a common wall.

24. The apparatus of claim 14, wherein the solid oxide fuel cell and the tail gas burner share a common wall.

* * * * *

UNITED STATES PATENT AND TRADEMARK OFFICE
CERTIFICATE OF CORRECTION

| | | |
|---|---|---|
| PATENT NO. | : 7,947,407 B2 | |
| APPLICATION NO. | : 11/115980 | |
| DATED | : May 24, 2011 | |
| INVENTOR(S) | : Samuel B. Schaevitz et al. | |

It is certified that error appears in the above-identified patent and that said Letters Patent is hereby corrected as shown below:

In Col. 15, line 30
replace "gm"
with --μm--

Signed and Sealed this
Ninth Day of August, 2011

David J. Kappos
*Director of the United States Patent and Trademark Office*